United States Patent [19]

Labaar et al.

[11] Patent Number: 4,891,649

[45] Date of Patent: Jan. 2, 1990

[54] NOISE SUPPRESSOR FOR PULSED SIGNAL RECEIVERS

[75] Inventors: Frederik Labaar, Long Beach; Algie L. Lance, deceased, Los Angeles, both of Calif., by Helen E. Lance, executrix

[73] Assignee: TRW Inc., Redondo Beach, Calif.

[21] Appl. No.: 239,918

[22] Filed: Sep. 2, 1988

[51] Int. Cl.4 ............................................. G01S 7/30
[52] U.S. Cl. .................................... 342/203; 342/175
[58] Field of Search ................ 342/175, 202, 203, 204

[56] References Cited

U.S. PATENT DOCUMENTS

| | | | |
|---|---|---|---|
| 2,147,810 | 2/1939 | Alford | 342/122 |
| 2,520,553 | 8/1950 | Lawson | 342/138 |
| 2,943,318 | 6/1960 | Deloraine et al. | 342/175 |
| 3,255,341 | 6/1966 | Wilcox | 342/15 |
| 3,680,044 | 7/1972 | Herman et al. | |
| 4,095,224 | 6/1978 | Dounce et al. | |
| 4,164,741 | 8/1979 | Schmidt | 342/152 |
| 4,614,946 | 9/1986 | Kaminetzky | 342/173 |
| 4,635,060 | 1/1987 | Mertens | 342/173 |
| 4,682,175 | 7/1987 | Lazarus | 342/122 |

Primary Examiner—Thomas H. Tarcza
Assistant Examiner—Mark Hellner
Attorney, Agent, or Firm—Ronald M. Goldman; Ronald L. Taylor

[57] ABSTRACT

A pulsed radar system has improved signal to noise characteristics obtained by suppressing phase noise. Means are provided to store a copy of the transmitted RF signal pulse, which copy contains any phase noise of the RF carrier that is transmitted. The signal copy is retained and following a delay interval the signal is mixed in a high frequency electronic RF mixer with the received RF pulse signal, the latter of which represents a reduced level signal as reflected by an object back to the system receiver's antenna following the lapse of an interval of time. The RF mixer produces an intermediate frequency signal output in which the phase noise is suppressed thereby enhancing the receiver's signal to noise ratio. A novel pulsed signal delay circuit is employed in the foregoing which retains the copy by continuously recirculating a fraction of that RF input pulse over time until it is needed; as when the pulse is to be applied to the RF mixer. The delay circuit includes a fiber optic cable that functions as a delay line. In a related invention the pulsed signal delay circuit is used as an element of a RF receiver to stretch the width of incoming pulses in the time domain to permit a more narrowband signal filter thereby increasing the signal to noise ratio.

22 Claims, 4 Drawing Sheets

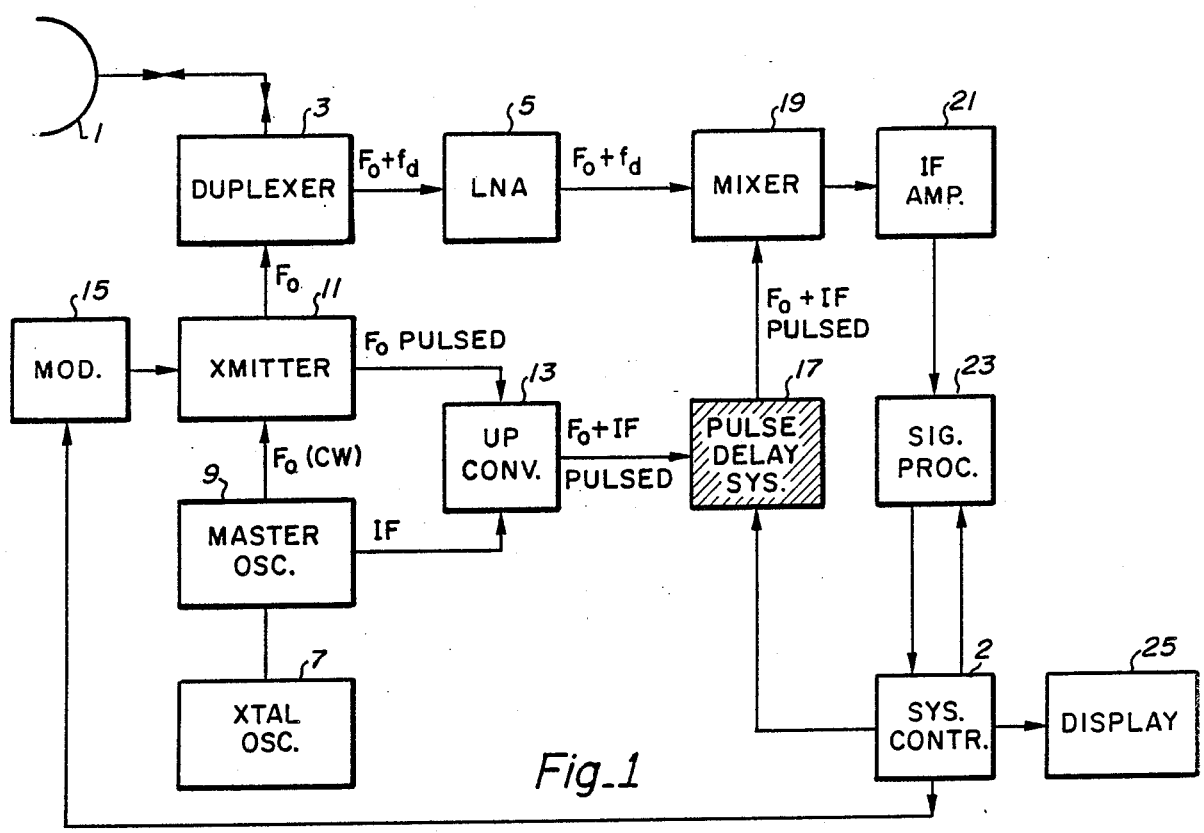
Fig_1
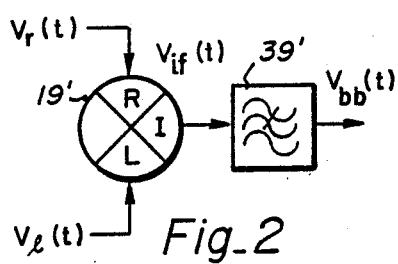
Fig_2
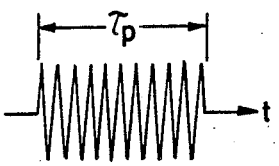
Fig_2a
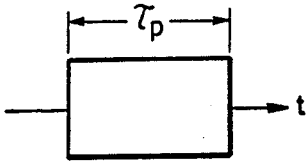
Fig_2b
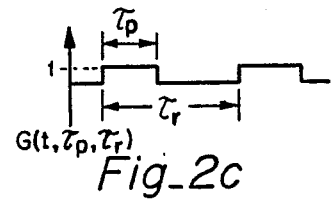
Fig_2c
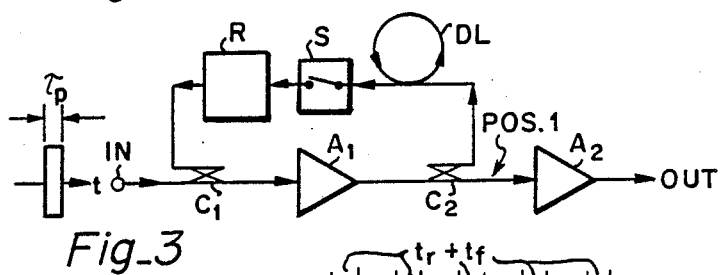
Fig_3
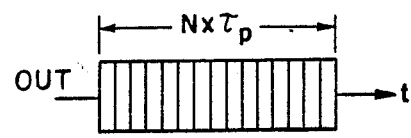
Fig_3a
Fig_3b
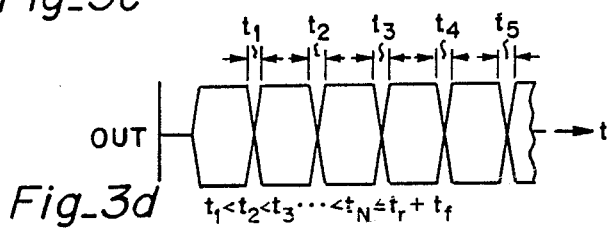
Fig_3c
Fig_3d
$t_1 < t_2 < t_3 \cdots < t_N \doteq t_r + t_f$

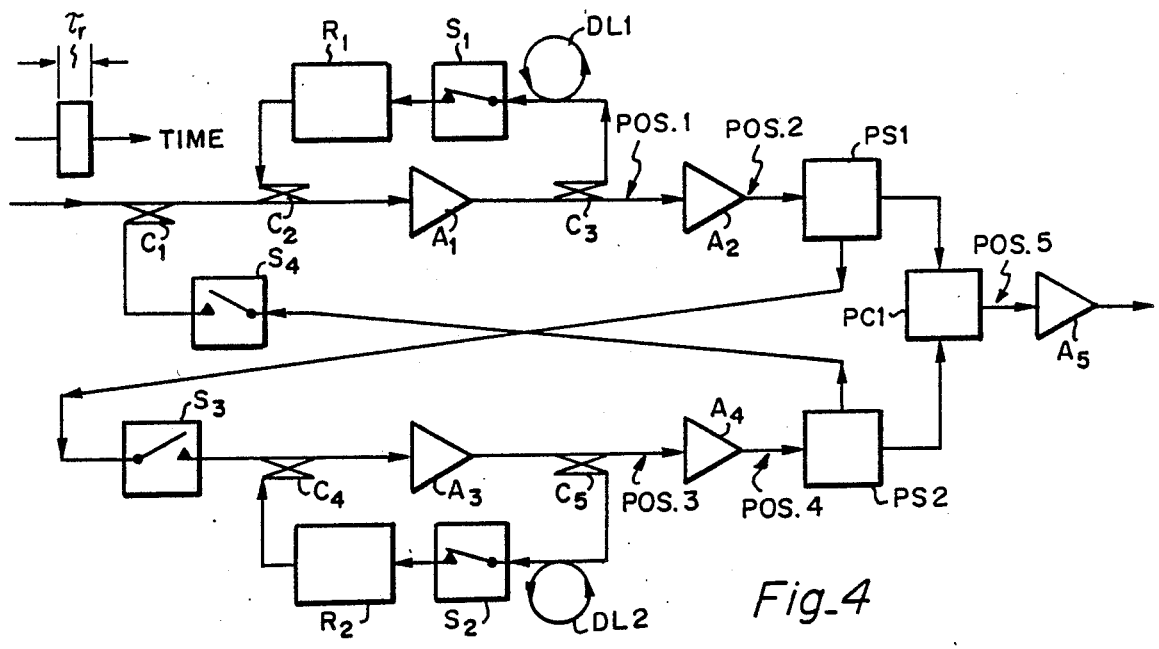
Fig_4
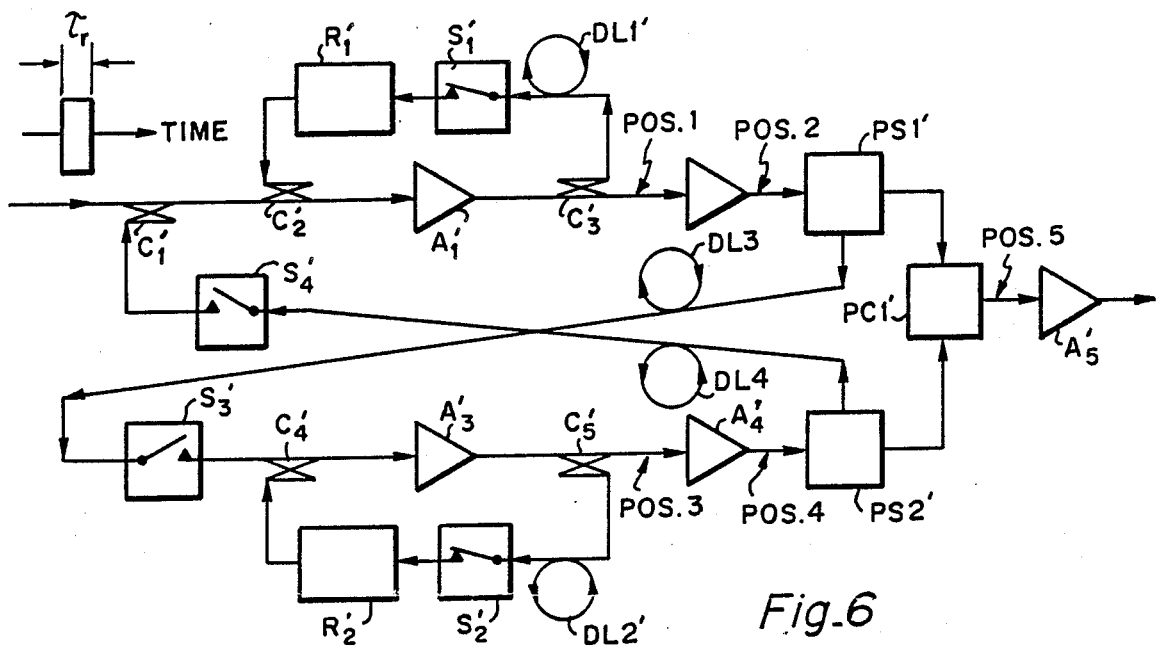
Fig_6

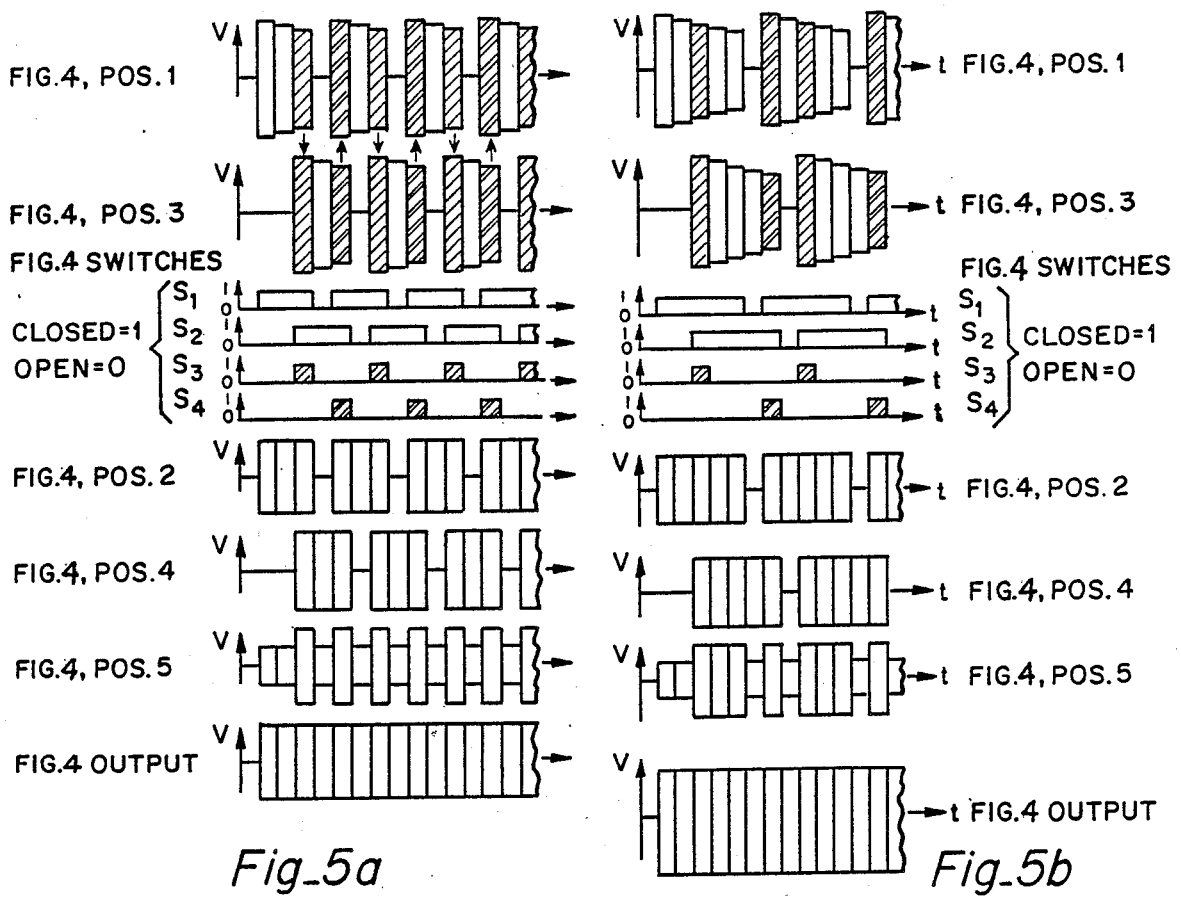
Fig_5a    Fig_5b
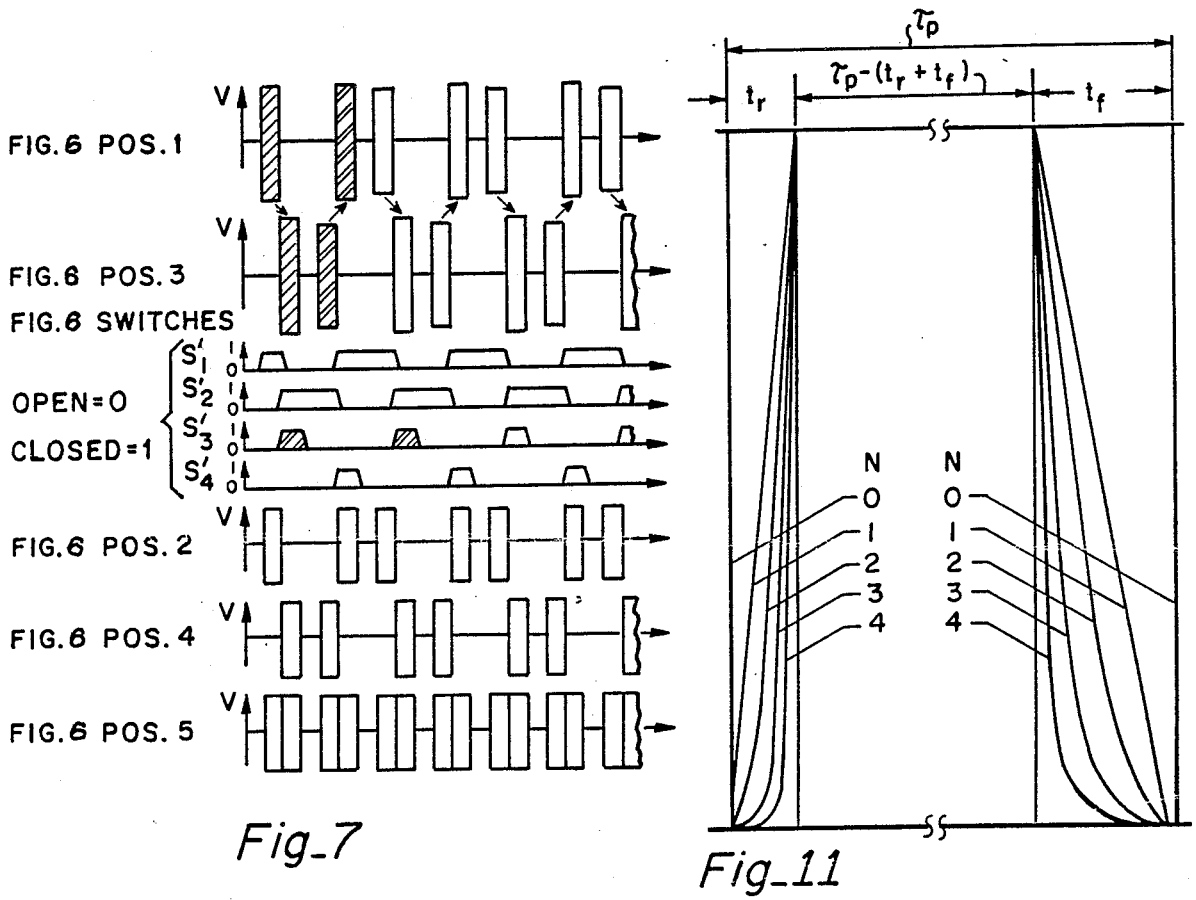
Fig_7    Fig_11

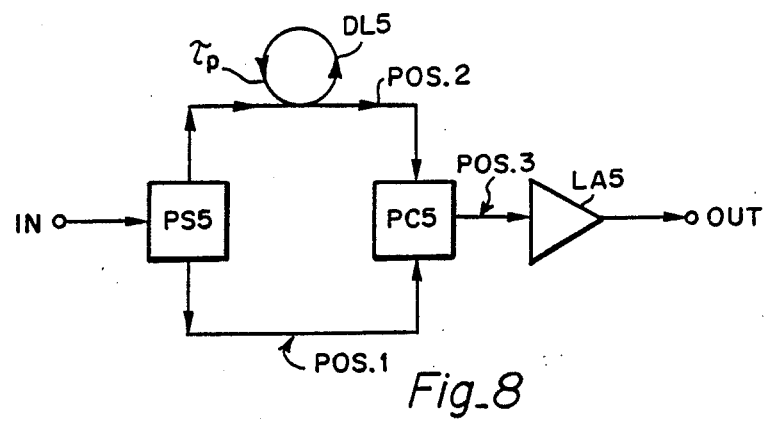
Fig_8
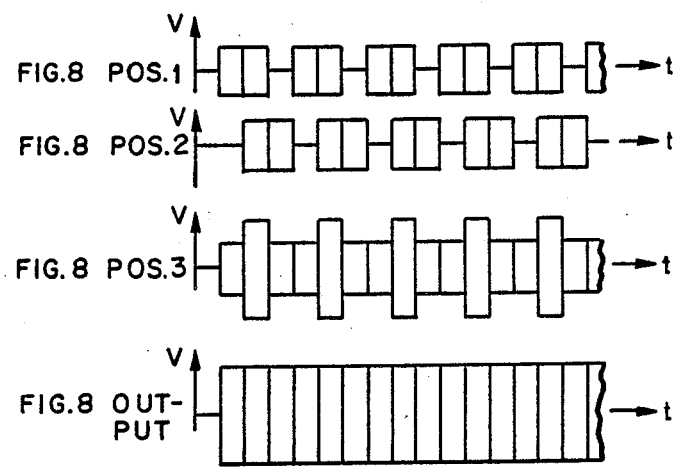
Fig_9
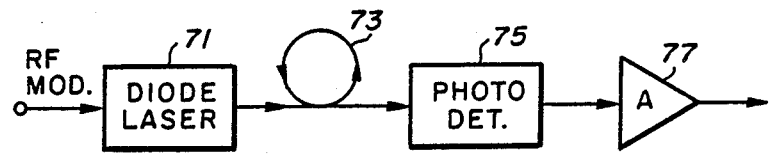
Fig_10

NOISE SUPPRESSOR FOR PULSED SIGNAL RECEIVERS

FIELD OF THE INVENTION

This invention relates to signal to noise ratio enhancement for electromagnetic signal receivers of pulsed signals and, more particularly but not limited, to apparatus and techniques for eliminating electronic phase noise within receivers of pulsed RF systems. The invention also relates to a pulse delay circuit useful in a noise suppressor of a radar system and in a RF pulse storing device of an electronic decoy system.

BACKGROUND

Electromagnetic energy receivers are known devices that detect RF energy, including RF energy in the microwave frequency spectrum. In one application such receivers are incorporated within conventional radar systems to receive and detect reflected radar signals. A predominant class of radar transmitters generates and emits electronic pulses; that is, RF pulses having a predetermined duration or width and other measurable electrical characteristics. In operation of the radar those RF pulses are propagated into space by the transmitting antenna. Typically these pulses are generated at a preset pulse repetition frequency, or, simply PRF. Should the emitted pulse be incident upon an electromagnetic energy reflecting object within the space, such as the metal surface of an aircraft moving through the space, a portion of the incident pulse is reflected back to and is received by the radar system's receiving antenna. The antenna couples the received RF pulse to the receiver, which processes the pulse and, in conjunction with the radar system's display apparatus, displays information from which intelligence concerning the movement and position of that object is communicated to persons operating the detection system.

"Noise" exists in all such electronic systems. The noise, more appropriately electronic noise, is a limiting factor in the electronic systems ability to detect and process received RF signals. If the energy level of the electronic noise in the system gets higher and higher with respect to the energy level of the received RF pulses, a point is reached at which it is no longer possible to recover the received RF pulse from the noise. The detection sensitivity of RF receiver is thus determined by the noise within the receiver. It is the suppression of a dominant portion of that kind of noise which the present invention addresses.

A typical radar receiver includes a "front end" that receives incoming RF signals picked up at the antenna and couples them to an RF mixer. The RF mixer combines the RF input signal with another signal supplied by a local oscillator within the receiver to generate an intermediate frequency or "IF" signal. The IF signal is processed; that is, amplified, filtered, and like conventional treatment. Following a stage of video detection the signal is again processed to finally be applied to the display apparatus, whether of an audio or visual type.

Radar systems may be either noncoherent or coherent. The latter kind can offer better signal to noise ratio and, hence, is often preferred, despite the increased complexity and cost of the circuitry. It is well known to those familiar with the art that in a coherent system, integration or summing of N pulses gives an N-fold improvement in the signal-to-noise, S/N, ratio, whereas in non-coherent system only an improvement of $\sqrt{N}$ can be obtained.

The radar receiver's IF signal contains basically two internal noise components; the semi-conductor noise; that is, the "shot" noise from the RF mixer and/or the field effect transistor, typically used in modern front ends; and, secondly, the noise produced by the receiver's local oscillator. The noise signals are internal to the system. Of the two types, the noise contributed by the local oscillator is invariably dominant.

Until recently the receiving system sensitivity was limited by so called "radar clutter" which is the various RF signals reflected from objects within the radar's field of view that are not of interest, such as ground clutter (reflections from vegetation, buildings, etc.) for an air-to-air radar, while the interest is reversed for a terrain following radar. The use of more selectives highly directional transmitting and/or receiving antennas, with lower side lobes, and the use of more sophisticated signal processing techniques, such as the use of improved signal processing algorithms in digital equipment associated with present day radar receivers, eliminates much of the clutter. The signal to clutter ratio can thus be pushed below the receivers signal to noise ratio in a number of modern radar systems. Hence, the sensitivity of the receiver is then limited by the level of electronic noise.

Noise suppression in RF receivers improves the receiving systems ability to detect and process reflected RF energy. Moreover noise suppression at the receiver is useful even if the existing noise level specifications are retained. Thus, for example, the transmitter noise specification can be significantly relaxed if noise suppression at the receiving end of the system suppresses the transmitted electronic noise. With a lesser noise specification for the transmitter, favorable design changes may be made to the transmitter portion of the system that incorporates additional or different features or technologies that otherwise could not presently be employed because they produce too much noise. For example, an injection or phase locked IMPATT transmitter, a relatively high powered RF device for its size, can be replaced with a free running IMPATT transmitter, which is a rather "noisy" device. This results in a lower cost transmitter having greater performance features in respects other than noise, particularly those having improved frequency agility characteristics.

A principle object of the invention is to eliminate phase noise in received RF pulsed signals. An ancillary object of the invention is to reduce the phase noise limitations of transmitters by suppressing any phase noise introduced into the transmitting signal at the receiver so as to provide a more versatile and/or economic transmitter in a transmitter receiver system combination, such as used in a radar system.

In attaining the foregoing objects, applicant's have discovered a novel pulse delay circuit. In that circuit means are provided to generate copies of the RF pulsed signal to form a train of contiguous pulses, thereby effectively retaining a copy of the RF input pulse over a prescribed time interval. The pulse delay circuit has application as an element of the principal invention and in other applications as well, including, but not limited to, electronic decoys in Electronic Warfare applications. Accordingly it is an ancillary object of the invention to provide an pulse delay circuit of novel and inexpensive structure. A still further object is to provide a pulse delay circuit that permits manufacture of low cost electronic decoys.

SUMMARY

In accordance with the invention means are provided in RF transmitting and receiving apparatus to store a copy of the RF signal pulse transmitted by the system transmitter including the signal's phase noise. The signal copy is then mixed in a high frequency electronic RF mixer with a small fraction of the transmitted original RF signal, which is a signal reflected by an object back to the receiver's antenna after the lapse of an interval of time. It is found that the RF mixer produces an intermediate frequency signal output that is free of the phase noise carried by the transmitted signal. In a more specific aspect to the invention the copy of the signal is stored in a delay and recirculating type storage system. Suitably the signal copy is retained for the appropriate duration under control of circuits associated with the receiver, which circuits automatically specify time intervals, such as the range gating circuits used in conventional radar systems. In a related invention the RF pulse storage system is employed in a receiver to reduce electronic noise passed through the receiver. Input pulses are effectively "increased" in width allowing for use of a more narrow bandpass filter than otherwise, the effect of which is to reduce broadband noise.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS

In the drawings:

FIG. 1 presents in block diagram form an improved coherent pulsed transmitter-receiver radar system containing the invention;

FIG. 2 schematically illustrates a standard RF mixer circuit which is used to define the variables used in the equations presented in this specification; FIGS. 2a, 2b and 2c illustrate input signal wave forms and the notation convention used to describe representative signal parameters;

FIG. 3 illustrates the Pulsed Signal Delay Line circuit in schematic diagram form;

FIGS. 3a and 3b illustrate the waveform envelopes as a function of time in two positions in the circuit of FIG. 3;

FIGS. 3c and 3d illustrate the waveforms corresponding to those of FIGS. 3a and 3b when finite pulse rise and fall times are taken into account;

FIG. 4 illustrates a additional embodiment of a Pulse Delay Line System using the circuit of FIG. 2 as one element;

FIGS. 5a and 5b illustrate the signal evolution as a function of time at different positions in the circuit of FIG. 4;

FIG. 6 is a Pulse Delay Line System of the kind illustrated in FIG. 4 but which incorporates "slow" switches;

FIG. 7 illustrates the signal evolution at different positions in the Pulse Delay Line System described by FIG. 6;

FIG. 8 is an accessory circuit that electronically fills in the "gaps" in the output pulse train occurring in operation of the circuit described in FIG. 6;

FIG. 9 shows the signal evolution at different positions in the embodiment of FIG. 8;

FIG. 10 illustrates a practical embodiment of a novel RF delay line system using fiber optic components, that is incorporated in the embodiments containing delay lines; and FIG. 11 shows the narrowing of pulses passing repeatedly through a switch or similar switches with a finite rise and fall time.

DETAILED DESCRIPTION OF THE PREFERRED EMBODIMENT

A typical pulsed coherent radar that incorporates the invention is represented in block diagram form in FIG. 1 to which reference is made. The blocks of the diagram graphically represent known electronic elements. Although those elements are complex in nature, the details of their construction are known to those skilled in the art and are not necessary to an understanding of the invention. Except for the block identified as the Pulse Delay System (PDS), therefore, the details of construction of the blocks are not further described. The less skilled reader may, however, wish to consult the technical literature for further details.

An antenna 1 is "duplexed" and serves as both the transmitting and receiving antenna on a "time shared" basis. The antenna is coupled to duplexer 3, a known device which passes transmitted RF to the antenna and the latter propagates the applied high power RF energy into space. In the presence of that transmitted high power RF, the duplexer blocks RF energy from passing to the RF receiver, a portion of which contains the Low Noise Amplifier, "LNA", 5. This action effectively shuts off the input to the radar's receiving section for the duration of the transmitted pulse to protect the receiving components from damage. Considering first the elements of the transmitting section, a crystal oscillator 7 provides a highly stable low frequency reference. Typically this type of oscillator may be installed in a constant temperature environment or "oven" to ensure high stability.

The crystal oscillator signal is coupled to the Master Oscillator 9. In turn the master oscillator generates the signals of the frequencies the system requires by conventional frequency synthesis techniques, such as frequency multiplication, phase locked loops, mixing and the like. The Master Oscillator's continuous wave (CW) output signals, in this case one at the transmit frequency, $F_o$, and another at the intermediate frequency, $F_{if}$, are phase locked to the crystal oscillator signal. A sample of the transmitter output signal, which is a pulsed signal with carrier frequency $F_o$, is taken and input to the Up-converter 13 together with the other Master Oscillator signal with frequency $F_{if}$. This results in a pulsed output signal from the Up-converter having a carrier frequency $F_o + F_{if}$, that is the sum of the two input frequencies. This signal is input to the pulse delay system 17, a novel circuit that is more fully described elsewhere in this specification. The pulse delay system provides "clones" of the upconverted RF signal and supplies that reproduction to the input of RF mixer 19 for a required interval of time determined by the host system.

System Controller 2 provides the control among the transmitting, receiving, and display circuits. At an appropriate time and during each cycle of operation the controller commands the transmit function by supplying a start signal to modulator 15. The latter generates the modulating pulse of appropriate duration which is applied to transmitter 11. These pulses turn the latter on and off to define at the output of transmitter 11 a high power RF pulse of frequency $F_o$. That high power pulse is coupled to the input of duplexer 3, the function of which was earlier described.

Transmitter 11 amplifies the low power RF signal supplied by the master oscillator to the power level required and supplies the RF energy to duplexer 3 which in turn completes a path through to the antenna from which the RF energy is propagated into space. In traveling through space the transmitted pulse may be incident upon a reflective object and reflected, as is more fully described hereafter. When the RF pulse ends, the duplexer is un-blocked and couples RF received at antenna 1 to low noise amplifier 5. This RF may be a pulse reflected from a remote object by way of example. Pulse delay system 17 receives the input pulse, representative of the transmitted pulse, as up converted by upconverter 13 and through a unique circuit operation, more fully hereinafter described, regenerates or effectively stores that RF pulse for a prescribed period of time, up to the transmitter's pulse repetition time, thereby maintaining a copy of the transmitted signal present and available throughout that interval at an input of mixer 19. Effectively the pulse delay system supplies a contiguous train of copies of the frequency upconverted transmitted pulse to the local oscillator input of the RF mixer. These copies contain the same essential phase noise that appears in the transmitted pulse and, hence, is also carried by the received pulse. There is coherency in phase, hence, this phase noise appearing in both signal inputs to the RF mixer is cancelled as shown by equations 1, 2 and 3.

The signal received by the Low Noise Amplifier, LNA, is generally shifted in frequency from the transmitted frequency by an amount of frequency, $f_d$, the Dopplar shift, due to the relative movement between transmitter and reflecting object. The output of LNA 5 is applied to the RF port of the mixer 19, together with the output of PDS 17 that serves as a local oscillator signal to the mixer. The resultant mixed signal is then applied to the input of IF amplifier 21.

The elements 5, 19 and 21 form a superheterodyne receiving system. The mixer's output signal, the intermediate frequency (IF), is amplified, processed (filtered, etc.) and then applied to a video detection circuit which in FIG. 1 is considered to be part of the Signal Processor 23 and is not separately illustrated. In turn the signal processor supplies signals to the system controller and through that controller to display 25.

As those skilled in the art recognize the antenna may be scanning various areas of the environment, either mechanically or electronically. Those aspects, however, are not relevant to an understanding of the invention. Hence, the description is continued without further describing antenna movement and its control, recognizing that systems incorporating the invention may include such kinds of antenna control. Moreover, range gating, a system function familiar to those skilled in the art, is in the schematic of FIG. 1 assumed as a part of the signal processor 23.

FIG. 2 is a block diagram representation of a RF mixer circuit and the application to the mixer of the various RF pulses occurring in the operation of the circuit of FIG. 1, the notation of which is used in demonstrating the mathematical proof of the results discovered. As depicted in the figure, a received RF pulse $V_r(t)$, which may be Doppler shifted in frequency from the transmitted RF pulse, is applied to one input of mixer 19'. A copy of the transmitted RF pulse $V_t(t)$ is applied to the local oscillator input of RF mixer 19'. The copy was stored, that is delayed, for a time interval determined by the operation of the aforedescribed circuits. The output of mixer 19' is a series of pulsed IF signals which are passed through a low pass filter 39', the output of which is the base band signal $V_{bb}(t)$, that is usually called "the" IF output, which is applied to appropriate circuits. It is shown in the related set of equations 1, 2 and specifically equation 3 that the noise term is cancelled out in the IF signal if the local oscillator signal is given the same delay as the received signal $V_r(t)$ at the RF port of the mixer. In the convention adopted in the drawings for the mixer, the filters are not separately identified in the other figures. It is understood that such element is implicit in the function of the mixer in order to output the stated signal.

Each RF pulse consists of numerous cycles in the amplitude of the signal represented by the sinusoidal waveform of FIG. 2a occurring at the high frequency rate established at the transmitter. For convenience in connection with this description only the envelope of that sinusoidal waveform is illustrated, such as is represented in FIG. 2b. The envelope of the RF pulse presented in FIG. 2c illustrates the notational convention used in this description. The modulating pulse is described as $G(t, \tau_p, \tau_r)$ in FIG. 2c, where $\tau_p$ represents the width or duration of the pulse and $\tau_r$ represents the pulse repetition time or simply PRF, the duration between the start of successive pulses.

The foregoing elements are shown in the context of the radar system apparatus illustrated in FIG. 1. In this the output of the low noise amplifier 5 and the output of pulse delay system 17 serve to output the pulse signals corresponding to $V_r(t)$ and $V_t(t)$, respectively and mixer 19 serves as the corresponding element to mixer 19' and low pass filter 39'.

The relationship is mathematically demonstrated. The transmitted signal is represented by equation 1:

$$V_p(t) = G(t, \tau_p, \tau_r)\{V_0 + \epsilon(t)\} \sin\{\Omega_0 t + \phi(t)\}, \qquad (1)$$

where $\tau_p$ is the pulse width, $\tau_r$ is the pulse repetition time, $\Omega_0$ is the carrier frequency, $\epsilon(t)$ is the amplitude noise term the absolute value of which is much smaller than $V_0$, and $\phi(t)$ is the phase noise term the absolute value of which is much less than one radian.

$$V_r(t) = \delta V_0 G(t-\tau, \tau_p, \tau_n) \sin\{\Omega_0(t-\tau) + \phi(t-\tau)\}, \qquad (2)$$

where $\delta$ is a system constant multiplied by the factor $\sqrt{(\sigma/R^4)}$; $\sigma$ is the target cross section, R is the range, and $\tau$ is the delay time, which is equal to $2R/c$, c representing the velocity of light.

With the mixer's conversion loss denoted by $L_c$, the IF voltage may be mathematically characterized:

$$\begin{aligned}(3)\; V_{if}(t) &= \sqrt{L_c}\,\delta v_0 G(t-\tau, \tau_p, \tau_r)\sin\{\Omega_0(t-\tau)+\Phi(t-\tau)\}\\ &\quad \sin\{(\Omega_0+2\pi IF)t+\Phi(t)\}\\ &= \tfrac{1}{2}\sqrt{L_c}\,\delta V_0 G(t-\tau, \tau_p, \tau_r)\\ &\quad [\cos\{-2\pi IF \cdot \Omega_0\tau+\Phi(t-\tau)\} - \#\cos\{(2\Omega_0+2\pi IF)t+\Phi(t)\}]\end{aligned}$$

After the IF signal is filtered by the low pass filter associated with the RF mixer, which eliminates the high frequency components of the signal, the IF voltage, $V_{if}$, yields $V_{bb}(t)$, the base band signal:

$$V_{bb}(t) = \tfrac{1}{2}\sqrt{L_c\delta}V_0 G(t-\tau,\ \tau_p,\ \tau_r)$$
$$\cos\{-2\pi IF_-\Omega_0\tau - \phi(t) + \phi(t-\tau)\}. \quad (4)$$

The elements in the expression $\phi(t)$ and $\phi(t-\tau)$ represent the noise terms. If $\phi(t)$ equals $\phi(t-\tau)$ the noise terms in equation 4 cancel. By delaying the generated pulse signal according to the invention the factor $\phi(t)$ becomes equal to $\phi(t-\tau)$ and the phase noise is cancelled.

The delay system referenced as element 17 in FIG. 1 is constructed to the circuit arrangement presented in FIG. 3, by way of example, to which reference is made. As illustrated in the block diagram in FIG. 3 from the coupling port of directional coupler $C_1$, a pulse signal is supplied to the input of an RF amplifier $A_1$, and the amplified output is connected to the input port of a directional coupler $C_2$, the coupling output port of which is connected to a delay line. The coupler, delay line, switch and attenuator form part of a feedback loop for amplifier $A_1$. Directional coupler $C_1$ completes the signal loop back to the input of amplifier $A_1$ through its coupling port. The output of the directional coupler $C_2$ is applied to a limiting amplifier $A_2$. The signal evolution with time at each of position 1 and the output is shown in FIGS. 3a and 3b, using the notational convention previously given by FIG. 2b.

As those skilled in the art appreciate, the described elements in this delay circuit are of conventional structure, except for the novel delay line described elsewhere in this specification. The circuit elements receive electrical operating current from conventional power supply circuits, not illustrated. The limiting amplifier $A_2$ and the like amplifiers used in the embodiments subsequently presented serve a signal conditioning function. Thus RF pulses of different voltage levels input to the amplifier are all output from those amplifiers as signals of equal levels as graphically illustrated by comparing FIG. 3a and FIG. 3b. The loop gain of the feedback circuit for amplifier $A_1$ is less than unity. That insures that the amplifier circuit is electronically stable and does not lapse into oscillation. A loop gain of minus 1 db usually provides adequate stability in the system.

When an RF pulse of a given pulse width, $\tau_p$, is applied at input port of directional coupler $C_1$ and switch S is closed, which is the condition illustrated in FIG. 3, the output of amplifier $A_1$, marked pos. 1 in the figure, is a defined train of contiguous pulses of decreasing amplitude levels, such as illustrated in FIG. 3a, if the round trip delay time of a RF pulse through amplifier, feedback loop and back to the amplifier equals the RF signal pulse width. The amplitude decay of the successive pulses is a consequence of the stability conditions imposed in the circuit in which the closed loop gain is less than one. The number of pulses in the train is purposely limited in accordance with a specific aspect of the invention. If the pulse loops around too many times, the pulse amplitude of the pulses that appear later in time are too low and although the signal to noise ratio in the circuit is still excellent, the signal conditioning (amplitude leveling) function of limiting amplifier $A_2$ cannot be maintained. When the input voltage falls below the range at which limiting action occurs, a practical consideration for the limiting amplifier, the circuit cannot function properly.

As earlier described the illustration in FIG. 2b is the envelope of the RF waveform shown in FIG. 2a. The RF signal carries within itself any phase noise appearing in the original transmitted RF pulse.

In practice amplifiers with 30 to 40 db gain and a 5 db maximum noise figure are fairly standard and serve as a suitable choice for amplifier $A_1$. In a preferred specific embodiment the number of pulse "round trips" about this feedback loop is limited in number, specifically by way of example, to ten. Hence, the signal that exits the circuit at output of $C_2$ is a replication of the input pulse with time separation determined by the delay time and with decreasing amplitude such as was illustrated in FIG. 3a. In the cases discussed the separation is zero. As a result the output of limiting amplifier $A_2$ is the contiguous train of pulses of uniform level as presented in FIG. 3b.

The foregoing description of operation for convenience assumed an infinitely short pulse rise and fall time. In practice the rise and fall times are finite. Thus the waveform envelopes appearing at position 1 and at the output in the circuit of FIG. 3 is more nearly represented in practice by the waveforms presented in FIGS. 3c and 3d in which the rise time is represented as $t_r$ and the fall time as $t_f$. The relationship between the consecutive pulses is such that $t1 < t2 < t3 < t4 < \ldots <$ or equal to the duration $t_r + t_f$.

Switch S is controlled by the system controller in the radar system via control and power leads not illustrated. The switch is opened by that circuit after a preset period of less than the radar system's pulse repetition time. The switch is reclosed on the start of the next radar pulse.

The pulse delay system of FIG. 3 may be employed as one delay element or building block of a more extensive delay circuit in order to extend or "bootstrap" the delay times that can be made available. The embodiment illustrated schematically in FIG. 4 creates large delays for pulsed RF signals and, as shown, uses two of the delay circuits previously described. Theoretically in this modification a single input pulse can be made to circulate in the circuit almost indefinitely. Two Pulsed Signal Delay Lines (PSDL) of the kind earlier described in connection with FIG. 3, the first built around amplifier $A_1$ and the second built around amplifier $A_3$, bounce the RF pulse back and forth between the two delay line circuits, in what may be termed a "ping-pong" mode of operation.

The first or "upper" PSDL illustrated in FIG. 4 includes a first amplifier $A_1$ and a delay feedback loop between the amplifier's output and input. The delay feedback loop includes the directional coupler $C_3$, the delay line DL1, the electronic switch $S_1$, attenuator $R_1$ and directional coupler $C_2$. The second or "lower" PSDL is of like circuit and contains amplifier $A_3$, shown in the lower part of the figure, and a directional coupler $C_5$, delay line DL2, switch $S_2$, attenuator $R_2$ and directional coupler $C_4$. Each delay feedback loop has a gain less than one and a delay time equal to the width or duration of the input pulse as was the design in the embodiment of FIG. 3.

The inputs and respectively the outputs of the upper and lower PSDL's are coupled to each others input via power splitters PS1 and PS2 and switches $S_3$ and $S_4$. Splitters PS1 and PS2 are also connected to power combiner PC1. The output of the power combiner is coupled to the input of limiting amplifier $A_5$ and that amplifier supplies the output signal of the PDS of FIG. 4.

The output of splitter PS1 is coupled in series with the Switch $S_3$, which is normally open and interrupting the electrical circuit, to the input of amplifier $A_3$ through the directional coupler $C_4$. The output of amplifier $A_3$ in this circuit is coupled into the feedback loop via the directional coupler $C_5$ as in the prior embodiment and to the input of limiting amplifier $A_4$. The output of the limiting amplifier $A_4$ is coupled to the second signal splitter PS2 and the splitter in turn has one output connected to the second input to power combiner PC1 and the other output is connected with switch $S_4$, which is normally open and interrupting the circuit or path, through a fifth directional coupler $C_1$ to the input of amplifier $A_1$.

As shown the output of combiner PC1 is connected to amplifier $A_5$ and the output of the latter serves as the output of the circuit. Various positions in the circuit are labeled as pos.1, pos.2 pos. 3, pos. 4, and pos. 5 and are discussed hereinafter in connection with the operation of the embodiment and the FIGS. 5a and 5b depicting waveforms at those locations.

In the following description of basic operation of the circuit of FIG. 4 it is assumed that the pulse rise and fall time and the switches' rise and fall time can be ignored. That is, the rise and fall times of the transmitted pulses and the transition time of the switches are very much smaller than the pulse width, $\tau_p$. However, these rise and fall times are finite for greater preciseness and are taken into account later in this description. The operation is described in conjunction with FIG. 5a, which shows the evolution of the RF pulse train with time with a minimum of three recirculations for each PSDL and references the waveforms illustrated to the various positions within the circuit of FIG. 4 at which the waveforms appear.

A single RF pulse is applied to the input of the PDS of FIG. 4 is coupled to the upper PSDL and circulates in that system for the requisite number of cycles, N where N is any whole number selected by the designer between 3 and 10 in the example given. The pulse may represent the frequency upconverted RF pulse as in the system of FIG. 1 or may represent pulses in connection with the applications described later in this description. Preferably the number of pulse circulations is set dynamically by the system controller. An example in which N is equal to three is depicted in the signal evolution diagram of FIG. 5a and a further example in which N equals five is depicted in the signal evolution diagram of FIG. 5b. The maximum number recommended is 10 for reasons previously given.

After the pulse signal has circulated the requisite N times in the upper PSDL, switch $S_1$ is operated and opens to break the pulse circulation circuit in the upper PSDL at the end of the Nth pulse, halting that circulation, and, concurrently switch $S_3$ is operated and closes at the start of the Nth pulse to couple, "ping", the last pulse of the upper PSDL to the input of the lower PSDL, where switch $S_2$ also closes at the start of the Nth pulse. The pulse circulates in the lower PSDL the requisite N times after which switch $S_2$ is energized and opens to break the pulse circulation in the lower PSDL, halting the feedback action, and, switch $S_4$ is energized and closes to couple or hand off the last pulse back, the "pong" in the "ping-pong" pulse handling operation, to the input of the upper PSDL. Thereafter the entire process repeats under control of the system controller.

The total number of times the pulse circulates, the effective duration in which the original pulse is effectively stored, depends upon the ratio of pulse repetition time to pulse width of the host system containing the PDS. The system must terminate the circulation of pulses before the host system is to generate the next pulse for propagation, which in the context of the given radar system, is the generation and transmission of the next outbound RF pulse.

At or prior to that time a condition is reached in which switch $S_1$ opens while switch $S_3$ does not close preventing the "hand off" of the pulse by the upper PSDL to the lower PSDL or, alternatively, switch $S_2$ opens and switch $S_4$ does not close in the lower PSDL to prevent the pulse from being "handed over" by the lower PSDL to the upper PSDL. The PDS then awaits receipt of another pulse at the input to reinitiate operation.

The signal evolution is described by FIG. 5a, where N is equal to 3, and, alternatively, is described by FIG. 5b, where N is equal to 5. These figures present in somewhat greater detail graphically the signal at each of the positions in FIG. 4 labeled positions 1 through 5. Considering FIG. 5a the signal at pos. 1, which is the output of amplifier $A_1$ in the upper PSDL, and the signal at pos. 3, which is the output of amplifier $A_3$ in the lower PSDL, are each a train of pulses of decreasing amplitude. These pulses are the input to the corresponding limiting amplifiers $A_2$ and $A_4$ to provide the associated train of constant level pulses at pos. 2 and pos. 4, respectively, in FIG. 5a. These signals are combined at pos. 5 at the output of the power combiner to give the contiguous pulse signals of alternating levels which are the input to limiting amplifier $A_5$ in FIG. 4. Finally a constant amplitude train of contiguous pulses appears at the output of limiting amplifier $A_5$.

In applications with short pulse trains, the limiting amplifiers $A_2$ and $A_4$ may in principle be omitted. However, inasmuch as the power splitters have at best only very limited isolation for signals traveling in the reverse direction, which may create unacceptable feedback levels of the signals of one PSDL into the other, the elimination of the amplifiers is not desired. The two limiting amplifiers, $A_2$ and $A_4$, desirably enhance this reverse isolation.

FIGS. 5a and 5b also prescribe the timing and operation of the switches. Switches $S_1$, $S_2$, $S_3$ and $S_4$ are represented by a "1" in the closed circuit condition and by a "0" in the open circuit condition. FIG. 5b shows the RF pulses in the same positions within the circuit and switch conditions for the switches, as appeared in FIG. 5a, except the pulse trains in the PSDL's consist of five pulses; N is equal to five. Control means not illustrated in detail provides the energy to operate the switches at the appropriate time described in the timing diagrams. The timing diagrams indeed define the schedule to be supplied by the control means in the particular embodiments illustrated. As those skilled in the art appreciate, the timing schedule is sufficient definition of that control element.

If the foregoing pulse delay circuit of FIG. 4 is used in the radar system, such as the radar system of FIG. 1 the circuit provides a properly delayed pulse that is used as a local oscillator signal for each of the contiguous range gates that the radar system requires to cover its operating range.

The switches used in all the embodiments of the applicable figures are electronic switches; more specifically they are either PIN switches or FET switches. With either kind of switch the state of the switch, that is whether it is open or closed is controlled by a pulsed bias signal. This has some bearing in any practical embodiment. The bias signal and the RF signal have a large, but finite, isolation from each other. This can also be stated by saying that there is a large but finite transimpedance between the bias port and the RF port of the switch and the transimpedance is mainly capacitive. As the PIN switch has been known for a much longer time than the FET switch, a certain terminology has come into being that was coined by PIN switch designers. The term refers to one consequence of the finite transimpedance, namely "DC feed thru". This terminology is, perhaps, a misnomer; it describes the fact that rise times of bias pulses for fast switches are so high that the content of the higher harmonic signals associated with that fast rise time are not negligible in the frequency spectrum of interest around the RF signal. Those harmonic signals, sometimes referred to as "video feedthrough", would detract from the operation of the invention if they are of a noticeable level. However, what is noticeable in one system may not be noticed in another as those skilled in the art appreciate.

The present invention deals with electronic noise. That noise is typically many orders of magnitude below the signal level. Hence, it does not take very much additional signal to markedly change the signal to noise ratio. Unfortunately it is not practical and is often insufficient for the switch designer to simply increase the rise time of the bias pulse in order to increase the switching device's switching speed. Device changes in the FET's or PIN diodes structure must be incorporated as well. Those device changes further reduce the transimpedance of the device, thereby compounding any "DC feed thru" problem as the switching speeds are increased.

For a Pulse Delay Line System in a system with narrow pulse widths, that is pulse widths less than about one microsecond, one needs to modify the circuits, such as the circuit of FIG. 4, to accommodate "slow" switches to suppress DC feed thru. A circuit implementing slow switches is shown in FIG. 6 in which like elements to that of FIG. 4 are given the same number primed. As schematically illustrated in FIG. 6 the circuit is essentially identical symbolically to that of FIG. 4, except that each of the links between the outputs of the delay circuit and the inputs of the other of the associated pair of delay circuits contains a delay line in series therewith with a delay time equal to the RF pulse width. Specifically delay line DL3 is connected between one output of splitter PS1' and the switch S3' and a delay line DL4 is connected between the output of splitter PS2' and switch S4'.

This embodiment allows switches with rise and fall times of a duration up to the RF pulse width itself. This is accomplished by using a delay of twice the RF pulse width, namely $2\tau_p$, in delay lines DL1' and DL2'. The PSDL's now produce a train of pulses in which the pulses are separated by $\tau_p$, thus allowing the switches to start opening/closing as appropriate in the aforedescribed operation and thereafter reach the fully open/closed state, respectively, well before and well after the pulse actually reaches the witch. During the passage of the pulse through the switch, the switch is fully open, hence there is minimum loss, but more importantly minimal distortion (pulse narrowing (FIG. 11), etc.).

The signal evolution in the circuit of FIG. 6 is described by FIG. 7 in the same manner as was previously done in FIGS. 5a and 5b. FIG. 7 represents the highest "ping-pong" frequency which, given the above limitations, should be avoided. The lower the ping-pong frequency the less switching per second and thus less of the minimal noise contribution that even a slow switch, at least in principle, contributes. It is also clear from the timing sequences of the switches, that it is necessary to have at least a "dead" time of $3\tau_p$ in duration between the pulse trains of each individual PSDL. Again reference is made to FIG. 7. The figure illustrates the signals at circuit locations Pos. 1 through Pos. 5 in FIG. 6; Pos. 5 shows there are gaps between the output pulses.

Applying this output signal to an accessory circuit as depicted in FIG. 8 fills the gaps of the signal so to speak. The accessory circuit includes a splitter PS5 having two outputs, one of which is coupled through a delay line DL5, with delay equal to the RF pulse width, to one input of a power combiner PC5 and the other of which is connected through to the power combiners second input. The output of combiner $PC_5$ is connected to the input of limiting amplifier LA5, which forms the output of the circuit. By coupling position 5 of the circuit of FIG. 6 to the input of splitter PS5 in this accessory circuit the output at amplifier LA5 is essentially continuous. The signal evolution diagram is presented in FIG. 9 and shows the signal variation with time at each of positions 1, 2 and 3 and the output in the accessory circuit of FIG. 8 when connected as described to the circuit of FIG. 6. The output is shown to be again a series of contiguous pulses.

In the pulse delay circuits presented in FIGS. 3, 4 and 6 the elements serve to store or, more appropriately, circulate the RF pulse supplied to the input of the circuit and continue to do so until the described switches terminate the process. Thus the "clone" signal or copy is present at the circuit's output over an extended interval. In the system of FIG. 1, the output of pulse delay system 17 supplies this RF output continuously and that RF output is present when the reflected pulse arrives through LNA 5 to the second input of the RF mixer. In this sense the delay circuit delays the input RF pulse; or is viewed as holding the input RF pulse available for the desired interval. In the figures the delay line was represented by a loop symbol. Although various delay lines may be employed in the embodiments, a delay line of novel structure makes the invention a practical embodiment of small size and wide RF bandwidth.

The practical implementation of the delay line used in the circuit of FIGS. 3, 4, 6 and 8 is represented in FIG. 10. A modulated diode laser 71 has an input, to which in this arrangement an RF pulse is supplied, such as the pulse input from the coupler $C_2$ in FIG. 3. The RF pulse amplitude modulates the diode laser. The laser's modulated light output is coupled to the input end of a fiber optic cable 73; that cable has an output end that couples the light output to photodetector 75. The electrical output of the photodetector in turn is amplified by amplifier 77, which outputs an RF pulse. This outputted pulse is then connected in circuit with switch S in FIG. 3.

Diode laser transmitters are commercially available that are capable of modulation up to a frequency of 10 Ghz, such as that provided by the Ortel Company of Alhambra, Calif. The signal transfer loss of the system, including a two decibel maximum signal loss per kilometer due to a multimode fiber optic cable (much less for single mode cable), is less than 36 decibels, which is for a large part due to RF mismatch loss. Theoretically this number can be reduced to 15 dB (including 2 dB cable loss) with proper RF matching circuits. This signal loss is easily compensated for by the amplification provided by a low noise RF amplifier, such as is provided in FIG. 4 by $A_1$ in FIG. 3. The amplitude noise level, often called AM noise, of the laser transmitter is typically minus 140 dBc (dB below carrier) and thus contributes negligibly to the signal noise. Phase noise of the light carrier is not detected by the photo detector and therefore does not need to be considered. Companies have reported diode lasers, which can be modulated up to 26 Ghz.

Although fiber optic systems of the described configuration have been used for communication purposes in which there is propagation transmission time, it is not believed that such an arrangement has been employed in a system in which the purpose or function of the arrangement is to create a delay for a RF or microwave signal. Accordingly the specific arrangement is a regarded as a novel RF/microwave delay line. For other systems requiring multiple pulse width capability, the fiber optic line can be tapped by inserting directional couplers terminated by photo detectors.

A practical embodiment of radar or decoy systems incorporating the pulse delay system must meet size and weight limitations imposed by the vehicle that is to carry it. One such vehicle is a missile, such as an air to air missile. Typical air to air missiles are generally cylindrical in shape and have approximately a six inch diameter. In a 50/125 multi mode fiber optic cable, the outer cable diameter is 125 micrometers. Hence, one layer of cable on a six inch diameter form provides a coil with 97 meters per inch of coil length. If the coil is made 10 layers deep, the coil thickness measures approximately 1.25 millimeters, approximately 5 hundredth of an inch and there is provided 970 meter cable/inch. This provides approximately 5 microseconds delay per inch of missile length. Pulse widths up to ten microseconds can easily be accommodated, such delay capabilities cover all airborne radar missiles. As far as is known no existing technology can offer the enormous RF bandwidth for comparable size and weight as the proposed fiber optic delay line and the foregoing demonstrates the practicality of use with such vehicles.

It should be noted that all RF and optical components used in the disclosed system, except for the fiber optic cable, can presently be built as a monolithic structure using existing technology. The size of the complete delay system; that is, microwave and optical integrated circuits and delay line is determined almost exclusively by the fiber optic cable coil.

FIG. 11 illustrates the narrowing in the width of the pulse as the pulse passes through a switch. With each transit through the switch, the pulse width reduces as indicated by the first through fourth passes.

Although the delay line system is described as an element of the noise suppressor system, it has independent use in other applications. Another example of a signal-to-noise improvement application of the described Pulse Delay System (PDS) is pulse broadening. It is known and may be shown that the optimum frequency bandpass for a pulsed signal is approximately equal to the inverse of the pulse width. The contiguous pulse trains, previously described, may be considered as a "stretching" of the input pulse in the time domain. As the pulse width is increased the required bandpass is decreased. Thus by stretching the RF pulse as described a more narrow band filter than before may be used, thereby blocking passage of more of the broad band electronic noise which reduces electronic noise in the system. Reducing the noise for a given signal strength enhances the signal to noise ratio. The contiguous RF pulse train the PDS generates means in effect that the output pulse is broadened with respect to the input pulse, even in the case that the pulse train is decaying, that is with no limiting amplifiers or signals below limiting threshold. The broadening of the signal in the time domain has as a consequence the narrowing of the signals' spectrum in the frequency domain. As the noise is broad band, the narrowing of the signals' frequency spectrum means better signal to noise ratio can be obtained by passing the signal through a narrower bandpass filter after pulse broadening. The signal-to-noise improvement is directly proportional to the bandwidth ratio of the optimum bandpass filter used for the input pulse to the bandwidth of the optimum bandpass filter for the output pulse. It is known that the optimum bandpass filter for RF pulses has a frequency bandwidth approximately equal to the inverse of the pulse width.

A slight reduction can be expected in the improvement ratio because at the boundaries of the contiguous pulse are the rise and fall time gaps, such as was earlier illustrated in FIG. 6 which means that there still is a higher frequency component in the output signal, the energy in which will be lost.

An advantage of this technique is that the S/N ratio for one received pulse can be improved. Standard techniques to improve S/N ratio's in pulsed systems are based on integration of a number of different pulses either by coherent or noncoherent integration (summing of sequentially received RF pulses. It is noted that these two techniques, pulse broadening and pulse integration, can be used concurrently.

Thus consider a receiver system that contains a front end for receiving RF pulses, a conversion system, such as the superhetrodyne type, for mixing that received RF in an RF mixer with another RF signal generated in a local oscillator or master oscillator to produce an intermediate frequency signal, an IF signal, that is sent through a bandpass filter and then amplified by IF amplifiers, passed through another bandpass filter and further processed by the conventional circuits to detect and display the received signal and/or information contained in the signal, such as where the RF is modulated and carries information in the modulation. The PDS described, such as the version illustrated in FIG. 3, may be placed in circuit following the derivation of the IF signal and perform the pulse stretching described on the IF frequency pulse. Such a circuit necessarily includes the control for the switch in the feedback circuit so as to interrupt the feedback circuit after a predetermined number of passages of the pulse through that circuit, for example ten pulses. The values of the bandpass filter succeeding that stage containing the PDS may be changed to make it more narrow so as to pass a more limited range of frequencies than possible in the conventional receiver system not containing the described Pulse Delay System.

The PDS may be connected alternatively to the RF stage, prior to the IF stage, in the described system as an alternative. However, as those skilled in the art appreciate, it is easier and far less complex to process or modify RF signals in the lower IF frequency range than at the higher RF frequencies in which transmissions are made, Moreover, although the aforedescribed receiver is described as having one IF stage, it may have two, three or more IF stages as is conventional and as an alternative arrangement, the Pulse Delay System may be connected to the output of any such IF stages to stretch the pulse at those points in the receiver instead.

Another fertile application terrain for Pulse Delay Systems is in Electronic Warfare (EW), which is divided in Electronic Counter Measures (ECM) and Electronic Counter Counter-Measures (ECCM). In these disciplines often a fine distinction is made between a "decoy" and a "deception" device. The first assists the attacker to confuse the defenses and the latter helps the defender to confuse the attacker. That distinction is not relevant to the invention; all such devices are referred to as decoys in the succeeding description.

In the following applications a delay of a single pulse is of import. As a consequence in the PDS the delay time of the delay lines can and will be longer than the longest pulse width that is expected to be applied.

One of the oldest decoys is the so called "Repeater Jammer". This decoy receives a pulsed RF signal, amplifies it and then retransmits it. In the process low level amplitude modulation can be applied to the signal. A decoy of this type can be very effective: the return pulse is relatively of such a high power level compared to a reflected signal that it activates the radar's automatic gain control circuit (AGC), a feature intended to prevent the receiver from being overloaded by a high power signal, and thereby depresses the low level reflected signal, the "echo", of the true target. If the AM modulation frequency is properly chosen, the decoy can cause very large angle tracking errors for conical scan radars.

A traditional problem always has been that as one cannot transmit and receive simultaneously with the transmitter and receiver being at the same location the received signal must be temporarily stored usually in a delay line. One practical technique of obtaining useful delay times is by using acoustic devices, such as SAW (Surface Acoustic Wave) devices, and, more recently, BAW (Bulk Acoustic Wave) devices. Although the performance of these acoustic devices in terms of bandwidth loss and frequency range have improved significantly to the present, that performance pales in comparison to bandwidth and frequency range of the RF/FO (Fiber Optic) delay line.

A simple repeater, in which the signal is not processed in any other way than that being amplified and re-transmitted, is likely to be a very effective decoy to protect important assets (ships, planes) against radar guided missiles, as for example the Exocet missile. Although the missile's radars will be made "smarter" in due time given new counter-counter measures, the present operation systems, which will be in use for many years to come, have a "simple" search radar which locks on the first largest target that it "sees". A calculation bears out that not much power is required by the repeater decoy to imitate a large target, one that has a large radar cross section, especially at close range. Therefore, at relatively little cost a ship can tow a tethered balloon or in the water a paravane, or have remotely piloted vehicles (RPV's) containing ne of these repeater type decoys and an infra red (IR) type decoy. Even if for some reason it is not possible to have a decoy in tow, one or more can be mounted on the ship in such a manner that the radar cross section centroid is put at an area of least possible damage, preventing the midship hits sustained by the naval vessel in the Falkland Islands war and more recently in the Persian Gulf.

There are of course excellent sophisticated "close-in" defense systems against missile attacks, the details of which are not relevant in this invention. All modern capital size naval ships have those sophisticated systems. It is financially and often even physically impossible and also undesirable from an operational viewpoint to equip every ship with such a sophisticated defense system. Decoys of the type described are a very attractive practical alternative. Given the cost of ships, a decoy as described given the perfection of techniques for fabricating integrated optic and microwave devices and resultant lower production costs is a very small fraction of the ships costs. Use of the present invention is even justified for ships that already have missile defenses with decoys since defenses can be overwhelmed.

One may expect that in a future conflict missiles will be launched in swarms and defense saturation must be of concern. Secondly, the system provides a large measure of protection against sneak attacks and even accidental launches from friendly forces. If the U.S. frigate Stark had such a decoy in tow, the error in judgement made by the commanding officer might not have had such disastrous consequences. It would also have prevented the first loss to an Exocet missile of a warship in the Falklands war, because on that occasion the sophisticated defense system closed down. The counter measure system was in the automatic mode and the computer queried it's "look up" table. Based on the table information, the computer decided that the radar that was "painting" the British ship was "friendly". In other words the designer's assumption was that war would be against Russia and not against France. The design criteria completely ignored other armed conflicts, the sale and/or capture of "friendly" systems by the enemy and copying of electronic systems; evidencing one kind of breakdown in the effectiveness of computerized war.

Decoys designed to be reeled out of the tail of an attack aircraft are being investigated. In all these applications, effectiveness, cost size, weight, simplicity of operation and wide frequency coverage are paramount. The proposed Pulse Delay System meets those requirements. It provides a simple and effective means to reproduce and retransmit the incoming radar pulses of the "seeking" radar so as to throw it off course or divert the attackers.

For convenience and to assist in understanding the construction and operation of the disclosed inventions, the delay times of the components, interconnections, amplifiers, etc. are ignored. In practice the delay times of the delay lines have to be reduced to account for other delays and the overall delay time should be as specified as those skilled in the art appreciate. Thus it is understood that when reference is made to the delay time of a circuit and the like such reference does not exclude, but necessarily includes the small delays introduced by these additional circuit elements.

Again for convenience in the prior embodiments all of the RF switches are shown without bias and control lines and as being of the reflective type. In practice it is usually preferable to use absorptive switches to prevent the possibility of resonances in the circuitry due to the high standing waves caused by the reflective switches. The invention is not limited to the details of any one kind of switch and other switches also useful in the various embodiments as developed may be substituted.

The principal invention achieves a reduction in phase noise and allows for greater flexibility in transmitter design. The method taught to accomplish the noise reduction is simple to understand and accomplish. The subsidiary invention provides an inexpensive pulse delay circuit having a wide range of application. One of those other applications is as an element of a low noise receiver as was described.

It is believed that the foregoing description of the preferred embodiment of the invention and the following claims which constitute a part of this description is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. An improved pulse type radar system, comprising:

RF transmitter means for generating RF energy pulses, said pulses being repeated at regular intervals defining a pulse repetition time;

RF receiver means for receiving and processing RF energy pulses;

antenna means for radiating RF energy pulses supplied by said transmitter means into space and for receiving RF energy pulses propagated from space and coupling said received RF energy pulses to said receiver means;

said transmitter means including:

RF generator means for supplying an RF carrier of principal frequency, $F_o$, and including phase noise, $\phi(t)$, represented by slight random phase changes with time of said RF carrier from said principal frequency;

pulse generating means for enabling said RF generator means for a predetermined pulse width interval and at a predetermined pulse repetition rate, whereby RF pulses of said carrier frequency spaced apart in time by said pulse repetition time are consecutively generated by said transmitter means and are propagated into space by said antenna means;

said receiver means for receiving such portion of said transmitted RF energy pulses as may be reflected from an RF energy reflecting object located within the space upon which object said transmitted pulses are incident, whereby said reflected RF pulse is received following an interval of time, T, said time being the period taken for a transmitted RF pulse to travel from said transmitter to said object and return to said receiver means;

said receiver means, including:

front end means for detecting RF energy at said antenna means and supplying said detected RF energy at an output;

RF mixer means, having at least two inputs and an output, for combining RF energy applied at said inputs to an intermediate frequency (IF) RF, $F_{if}$, at an output; said intermediate frequency energy having a frequency which is the difference of the frequencies of the two RF signals applied to said respective inputs;

said receiver front end means output being coupled to an input of said mixer means for supplying said receive detected RF pulses to a first input of said mixer means;

local oscillator means for supplying an RF signal to one input of said mixer of a frequency equal to the sum of said carrier and IF comprising:

frequency upconverter means for upconverting each transmitted RF energy pulse coupled from the transmitter means to produce a copy of the transmitted RF pulse, including the latter's phase noise;

duplicate pulse generating means coupled to the output of said upconverter for providing a contiguous train of RF pulses that are copies of the RF pulse inputted by said upconverter means, said train extending over an interval of time, $T_2$, said interval $T_2$ being at least as great as said time T, said pulse width interval, but less than said transmitter means pulse repetition time;

and coupling means for coupling the output of said local oscillator means to said local oscillator input of said RF mixer means;

whereby said phase noise contained in said duplicate RF pulse essentially cancels the corresponding phase noise contained in the received reflected RF pulse to provide an intermediate frequency RF output from said mixer of reduced phase noise content;

amplifier and display means for processing and displaying pulses appearing in the IF frequency output from said RF mixer means, representing received RF pulses;

range gating means for enabling said processing said display means at selected time intervals, $T_a$, $T_b$, $T_c$ . . . $T_n$, which intervals covers partially or wholly said pulse repetition interval, following the transmission of each RF pulse by said transmitter means, whereby pulse information displayed may be limited to those received within a period commencing with or in an interval of time in which a reflected RF pulse is received; and control means for controlling said selected time intervals of said range gating means and said time period $T_2$ of said duplicate RF pulse generating means.

2. The invention as defined in claim 1 wherein said duplicate RF pulse generating means comprises: a delay system for maintaining presence at an output for a predetermined interval of pulsed RF signals representative of a pulsed RF signal of predetermined duration received at an input, including:

linear amplifier means having an input and an output for amplifying a pulsed RF signal applied at an input;

limiting amplifier means for providing a constant level RF output responsive to multilevel RF signals applied at an input, said limiting amplifier means having its input coupled to said output of said linear amplifier means, whereby a constant peak level RF output is obtained irrespective of amplitude level variations of the RF signal applied at said input;

feedback circuit means coupled between the output and input of said linear amplifier means; said feedback circuit means having an attenuative characteristic for reducing the level of the feedback signal to a level less than the level of the input signal to said linear amplifier means and for delaying passage of RF pulses introduced into said feedback circuit by said predetermined interval of said input RF pulse, said interval being at least equal to said RF pulse width.

3. The invention as defined in claim 2 wherein said duplicate RF pulse generating means comprises: circuit means for producing a contiguous train of RF pulses responsive to a single RF pulse signal of predetermined width received at an input to effectively store the received RF pulse, including:

first and second pulse storing circuit means for storing RF pulses, each of said RF pulse storing circuit means comprising:
linear amplifier means for amplifying RF signals applied at an input and supplying an amplified RF signal at an output;
feedback circuit means, said feedback circuit means being connected between the output and input of said linear amplifier means; said feedback circuit means having a attenuative characteristic for reducing the level of the feedback signals to a level less than the level of the input signal to said associated linear amplifier means and for delaying RF pulses introduced into said circuit for said predetermined duration of said input RF pulse;
first coupling circuit means responsive to a control signal for coupling a portion of the output of said first RF pulse storing circuit means to the input of said second delay circuit means for a predetermined interval to hand over an RF pulse to the second RF pulse storing circuit means;
second coupling circuit means responsive to a control signal for coupling the output of said second RF pulse storing circuit means to the input of said first RF pulse storing circuit means for a predetermined interval to hand over an RF pulse to the first RF pulse storing circuit means;
first control means for interrupting said feedback circuit means of said first RF pulse storing circuit means for interrupting said feedback loop following the lapse of a predetermined interval to prevent further storing of RF pulses until an RF pulse is thereafter again applied to said associated first linear amplifier means input;
second control means for enabling said first coupling circuit means to pass the final RF pulse stored in said first RF pulse storing circuit means over to said second pulse storing circuit means;
third control means for interrupting said feedback circuit means of said second RF pulse storing circuit means for interrupting said associated feedback loop following the lapse of a predetermined interval to prevent further storage of RF pulses by said second pulse storing means until an RF pulse is thereafter again passed on by said associated second control means; and
fourth control means for enabling said second coupling circuit means to pass the final RF pulse stored in said second RF pulse storing circuit means to the input of said first RF pulse storing circuit means.

4. A delay system for maintaining presence at an output for a predetermined interval of an RF signal representative of a pulsed RF signal of predetermined duration received at an input, comprising:

linear amplifier means having an input and an output for amplifying a pulsed RF signal applied at an input;
limiting amplifier means for providing a constant peak level RF output responsive to multilevel RF signals applied at an input, said limiting amplifier means having its input coupled to said output of said linear amplifier means, whereby a constant peak level RF output is obtained irrespective of amplitude level variations of the RF signal applied at said input;
feedback circuit means coupled between the output and input of said linear amplifier means; said feedback circuit means having an attenuative characteristic for reducing the level of input signals to a level at the output less than the level of said input signal to said linear amplifier means and for delaying passage of pulses introduced into said feedback circuit by said predetermined interval of said input RF pulse, said interval being at least equal to said pulse width.

5. The invention as defined in claim 4 wherein said feedback circuit means includes:

first coupler means;
second coupler means;
delay line means for providing an extended signal propagation path between an input and an output, the length of said delay line means being of a length sufficient to produce a delay essentially equal to the duration of said RF input pulse;
switch means, said switch means being normally closed to complete a circuit between an input and output and for opening said feedback circuit means responsive to energization;
attenuator means;
said aforementioned means first and second coupler means, delay line, switch means and attenuator means being connected in series between said output and input of said linear amplifier means to permit feedback of an RF pulse of essentially equal duration to said received RF pulse when said switch means is in the closed condition; whereby said linear amplifier means continues to amplify RF signals to provide a train of RF output pulses of decreasing amplitude and whereby a constant peak level RF output is provided at the output of said limiting amplifier means; and further comprising:
control means for energizing said switch means to interrupt said feedback circuit means upon the expiration of a predetermined interval, said control means including means for energizing said switch means.

6. The invention as defined in claim 5 wherein said delay line means comprises:

RF modulated laser means for generating an amplitude modulated light output;
light waveguide means for receiving the output of said laser means and propagating said light over a predetermined length to an output, said light waveguide means being in the form of a fiber optic cable of extended length;
photodetector means coupled to the output of said light waveguide means for converting light coupled from said light waveguide into electrical signals; and
amplifier means for amplifying the output from said photodetector means.

7. A circuit for producing a contiguous train of RF pulses responsive to a single RF pulse signal of predetermined width received at an input to effectively store the received RF pulse, comprising:

first and second pulse storing circuit means for storing RF pulses, each of said pulse storing circuit means comprising:

linear amplifier means for amplifying RF signals applied at an input and supplying an amplified RF signal at an output;

feedback circuit means, said feedback circuit means being connected between the output and input of said linear amplifier means; said feedback circuit means having a attenuative characteristic for reducing the level of input signals to a level at the output less than the level of said input signal to sad associated linear amplifier means and for delaying RF pulses introduced into said circuit for said predetermined duration of said RF input pulse;

first coupling circuit means, responsive to a control signal for coupling a portion of the output of said first RF pulse storing circuit means to the input of said second delay circuit means for a predetermined interval to hand over an RF pulse to the second RF pulse storing circuit means;

second coupling circuit means responsive to a control signal for coupling the output of said second RF pulse storing circuit means to the input of said first RF pulse storing circuit means for a predetermined interval to hand over an RF pulse to the first RF pulse storing circuit means;

first control means for interrupting said feedback circuit means of said first RF pulse storing circuit means for interrupting said feedback loop following the lapse of a predetermined interval to prevent further storage of RF pulses until a RF pulse is thereafter again applied to said associated first linear amplifier means input;

second control means for enabling said first coupling circuit means to pass the final RF pulse stored in said first RF pulse storing circuit means over to said second RF pulse storing circuit means;

third control means for interrupting said feedback circuit means of said second RF pulse storing circuit means for interrupting said feedback loop following the lapse of a predetermined interval to prevent further storage of RF pulses by said second pulse storing means until an RF pulse is passed again to said associated first linear amplifier means input of said second pulse storing means; and fourth control means for enabling said second coupling circuit means to pass the final RF pulse stored in said second RF pulse storing circuit means to the input of said first RF pulse storing circuit means.

8. A circuit for producing a contiguous train of RF pulses responsive to a single RF pulse signal of predetermined width received at an input to effectively store the received RF pulse, comprising:

first and second RF pulse storing circuit means for storing RF pulses, each of said RF pulse storing circuit means comprising:

linear amplifier means for amplifying RF signals applied at an input and supplying an amplified RF signal at an output;

feedback circuit means, said feedback circuit means being connected between the output and input of said linear amplifier means; said feedback circuit means having a attenuative characteristic for reducing the level of input signals to a level at the output less than the level of said input signal to said associated linear amplifier means and for delaying pulses introduced into said circuit for said predetermined duration of said input pulse; said feedback circuit means further including:

first coupler means;

second coupler means;

delay line means for providing a signal propagation path of extended length between an input and an output to produce a propagation delay, the length of said propagation delay being essentially equal to the duration of said input RF pulse;

switch means, said switch means being normally closed to complete a circuit between an input and output and for opening said circuit responsive to energization;

attenuator means;

said aforementioned coupler, switch and attenuator means being connected in series between said output and input of said linear amplifier means for feeding back a RF pulse of essentially equal duration to said received RF pulse and of lesser amplitude level, whereby said amplifier means may continue to amplify signals to provide a serial train of output RF pulses of decreasing amplitude;

first coupling circuit means responsive to a control signal for coupling a portion of the output of said first RF pulse storing circuit means to the input of said second delay circuit means for a predetermined interval to hand over an RF pulse to the second RF pulse storing circuit means; said first coupling circuit means comprising:

splitter means coupled to the output of said first RF pulse delay circuit;

normally open switch means coupled between the output of said splitter means and said input of said second RF pulse storage circuit for completing an RF path therebetween responsive to energization to permit input of a RF pulse to said second RF pulse delay circuit;

second coupling circuit means responsive to a control signal for coupling the output of said second RF pulse storing circuit means to the input of said first RF pulse storing circuit means for a predetermined interval to hand over an RF pulse to the first RF pulse storing circuit means, said second coupling circuit means comprising:

second splitter means coupled between the output of said second RF delay circuit means;

switch means coupled between the output of said second splitter means and said input of said first RF pulse storing circuit for completing an RF path therebetween responsive to energization to permit a RF pulse to the input of said first RF pulse storing circuit means;

final limiting amplifier means for providing an RF signal output of relatively constant peak level responsive to RF signals applied to an input;

combiner means coupled to a second output of each of said splitter means of said first and second RF pulse storing circuit means and having an output coupled to the input of said limiting amplifier means for supplying RF signals outputted from each of said RF pulse storing circuit means to said final limiting amplifier input, whereby a RF pulse train of constant peak amplitude is provided;

first control means for energizing said switch means in said feedback circuit means of said first RF pulse storing circuit means for interrupting said feedback loop following the lapse of a predetermined interval to prevent further storage of RF pulses until an RF pulse is thereafter again applied to said associated first linear amplifier means input;

second control means for temporarily energizing said switch means in said first coupling circuit means to pass the final RF pulse in said first pulse storing circuit means over to said second RF pulse storing circuit means;

third control means for energizing said switch means in said feedback circuit means of said second RF pulse storing circuit means for interrupting said associated feedback loop following the lapse of a predetermined interval to prevent further storage of RF pulses by said second RF pulse storing means until an RF pulse is thereafter again applied to said associated first linear amplifier means input of said second RF pulse regenerating means;

fourth control means for temporarily energizing said switch means in said second coupling circuit means to pass the final RF pulse stored in said second RF pulse storage circuit means to the input of said first RF pulse storing circuit means.

9. The invention as defined in claim 8 further comprising:

a third delay line;
said third delay line being coupled in series circuit in said first coupling circuit for delaying passage of pulsed RF signals through said circuit;
a fourth delay line;
said fourth delay line being coupled in series circuit in said second coupling circuit for delaying passage of pulsed RF signals through said circuit, whereby the transition time of said switch means may be reduced.

10. The invention as defined in claim 8 wherein said first delay circuit includes: limiting amplifier means coupled to the input of said power combiner for providing a constant peak level RF output responsive to RF supplied at its input, said limiting amplifier means having its input coupled to the output of said linear amplifier means for amplifying RF output signals from said linear amplifier means.

11. The invention as defined in claim 8 wherein each said coupling circuit includes delay line means for increasing the propagation time for passage of pulsed RF signals through said coupling circuit, whereby transition time of said switch means may be increased.

12. A delay circuit for use with RF pulses having a duration of $T_1$, for producing a contiguous train of RF pulses over an interval greater than $T_1$ comprising:

linear amplifier means for producing at an output an amplified RF pulse responsive to an RF pulse applied at an input;
at least one delay feedback loop coupled between the output and input of said amplifier means for producing a RF pulse at said amplifier input a predetermined duration of time following the appearance of said amplified initial RF pulse at said amplifier means output, said duration being essentially equal to the width of the input pulse $T_1$ and the level of said pulse being less than the level of said preceding pulse; said loop having a loop gain of less than unity;
switch means in said feedback loop responsive to energization for interrupting said feedback loop for preventing operation of said feedback loop during said interruption, whereby said linear amplifier means ceases to produce pulse outputs and resumes a quiescent condition awaiting another RF pulse at the input thereof;
at least one limiting amplifier for producing an output of a constant RF level, irrespective of variations of the input RF signal; said limiting amplifier having an input coupled to the output of said linear amplifier means for amplifying RF pulses provided by said amplifier and providing said amplified signal at an output.

13. The invention as defined in claim 12 further including:

control means for energizing said switch means upon the lapse of an interval of time $T_2$, where $T_2$ is equal or greater than $3T_1$ and equal or less than $10T_1$.

14. The invention as defined in claim 12 wherein said delay feedback loop includes:

a fiber optic cable.

15. The method of suppressing electronic phase noise contained within RF pulse signals receives at an RF receiver of a transmitter and receiver system with said receiver containing IF amplifiers for amplifying signals of an IF frequency, said RF pulse signals originating in and being propagated from said transmitter, comprising the steps of:

storing a copy of the pulsed RF signal transmitted by the system transmitter in the form of an RF signal that differs from the transmitted RF signal by an amount equal to said IF frequency in an analog storing device, said transmitted pulse RF signal containing any phase noise introduced therein at the moment of transmission by the transmitter;
receiving the reflected pulsed RF signal at the receiver following a delay interval, T, subsequent to the transmission of said RF signal; and
combining said received pulsed RF signal and said stored copy in an RF mixer to provide a phase noise free intermediate frequency pulse signal of the duration of said transmitted RF pulse.

16. The method of suppressing electronic phase noise contained within RF pulse signals received at an RF receiver of a transmitter and receiver system, said RF pulse signals originating in and being propagated from said transmitter, comprising the steps of:

storing a copy of the pulsed RF signal transmitted by the system transmitter in an analog storing device, said transmitted pulse RF signal containing any phase noise introduced therein at the moment of transmission by the transmitter;
receiving the reflected pulsed RF signal at the receiver following a delay interval, T, subsequent to the transmission of said RF signal; and
combining said received pulsed RF signal and said stored copy in an RF mixer to provide a phase noise free intermediate frequency pulse signal of the duration of said transmitted RF pulse and wherein the step of storing a copy of said pulsed RF signal includes the steps of:
applying a portion of said RF signal to a frequency up-converter and combining said signal with an IF frequency signal to provide a combined signal at an output of a frequency equal to the sum of the two frequencies at the output of said up-converter;
applying said combined signal output of said frequency up-converter to the input of a pulse delay system, said combined signal forming a copy of said pulsed RF signal translated in frequency, to maintain said combined signal available for an interval of time;
and wherein the step of combining said pulsed RF signal and said stored copy includes the steps of:

applying said received signal and the signal output of said analogue storing device to the inputs of an RF mixer means to provide an output pulse at a frequency equal to the difference in frequency between said two signals.

17. In an RF receiver of the kind adapted to receive and process RF pulses and which contains means for receiving an RF pulse having a predetermined width and predetermined frequency in the RF region and means for converting the RF pulse from the high frequency region to an RF pulse in an intermediate frequency (IF) region and processing circuits for demodulating and displaying information represented in or by said RF pulse, the improvement comprising:
- pulse stretching means for storing copies of a received RF pulse to form a train of N contiguous RF pulses, said N being an integer number, providing a pulse that is of greater width or stretched in the time domain corresponding to said received pulse, said stretched pulse being greater in width than said predetermined width of said RF pulse;
- means for applying said input RF pulse to said pulse stretching means;
- filter means coupled to the output of said RF pulse stretching means for passing RF in a predetermined frequency bandwidth, said frequency bandwidth being the optimal frequency bandwidth for a filter for a RF pulse of said predetermined width and shape, in terms of optimal signal to noise ratio; and
- means coupling said filter means output to said signal processing circuits of said receiver means;
- whereby the signal to noise ratio of said receiver is enhanced by reduction of electronic noise due to the difference between the optimum frequency bandwidth for said received RF pulse and the optimum frequency bandwidth of said stretched RF pulse, the optima in terms of signal to noise ratio.

18. The invention as defined in claim 17, wherein said pulse stretching means comprises:
- linear amplifier means for producing at an output an amplified RF pulse responsive to an RF pulse applied at an input;
- at least one delay line feedback loop coupled between the output and input of said amplifier means for producing contiguous pulses at said amplifier output for a predetermined duration of time following the appearance of said initial pulse at said amplifier means input, and the level of each said pulses being less than the level of its preceding pulse; said loop having a loop gain of less than unity;
- switch means in said feedback loop responsive to energization for interrupting said feedback loop for preventing operation of said feedback loop during said interruption, whereby said linear amplifier means ceases to produce pulse outputs and resumes a quiescent condition awaiting another RF pulse at the input thereof;
- whereby responsive to input of an RF pulse having a duration of $T_1$, a contiguous train of RF pulses is produced extending over an interval $NT_1$, N being an integer and $T_1$ being the RF pulse width.

19. The invention as defined in claim 17, wherein said pulse stretching circuit comprises: RF pulse delay system means for maintaining presence at an output for a predetermined interval of an RF signal representative of a pulsed RF signal of predetermined duration received at an input.

20. The invention as defined in claim 19 wherein said pulse delay system means comprises:
- linear amplifier means having an input and an output for amplifying a pulsed RF signal applied at an input;
- feedback circuit means coupled between the output and input of said linear amplifier mean; said feedback circuit means having an attenuative characteristic for reducing the level of input signals to a level at the output less than the level of said input signal to said linear amplifier means and for delaying passage of pulses introduced into said feedback circuit by a predetermined interval, said interval being at least equal to said pulse width.

21. The invention as defined in claim 20 wherein said RF pulse delay circuit means further includes:
- limiting amplifier means for providing a constant peak level RF output responsive to multilevel RF signals applied at an input, said limiting amplifier means having its input coupled to said output of said linear amplifier means, whereby a constant peak level RF output is obtained irrespective of amplitude level variations of the RF signal applied at said input.

22. The invention as defined in claim 20 wherein said feedback circuit means includes:
- first coupler means;
- second coupler means;
- delay line means for providing an extended signal propagation path between an input and an output, the length of said delay line means being of a length sufficient to produce a delay essentially equal to the duration of said input RF pulse;
- switch means, said switch means being normally closed to complete a circuit between an input and output and for opening said feedback circuit means responsive to energization;
- attenuator means;
- said aforementioned means first and second coupler means, delay line, switch means and attenuator means being connected in series between said output and input of said linear amplifier means to permit feedback of an RF pulse of essentially equal duration to said received RF pulse when said switch means is in the closed condition; whereby said linear amplifier means continues to amplify RF signals to provide a serial train of RF output pulses of decreasing amplitude and whereby a constant peak level RF output is provided at the output of said limiting amplifier means; and further comprising:
- control means for energizing said switch means to interrupt said feedback circuit means upon the expiration of a predetermined interval, said control means including means for energizing said switch means.

* * * * *